(12) United States Patent
Hanounik

(10) Patent No.: US 7,006,627 B2
(45) Date of Patent: Feb. 28, 2006

(54) CIPHER BLOCK CHAINING MODE IN ENCRYPTION/DECRYPTION PROCESSING

(75) Inventor: Bedros Hanounik, San Jose, CA (US)

(73) Assignee: Tarari, Inc., San Diego, CA (US)

( * ) Notice: Subject to any disclaimer, the term of this patent is extended or adjusted under 35 U.S.C. 154(b) by 867 days.

(21) Appl. No.: 09/968,476

(22) Filed: Sep. 28, 2001

(65) Prior Publication Data

US 2003/0063741 A1    Apr. 3, 2003

(51) Int. Cl.
*H04K 1/00*    (2006.01)
*H04L 9/06*    (2006.01)

(52) U.S. Cl. ............................. 380/29; 380/37; 380/43
(58) Field of Classification Search ................ 380/43, 380/42, 37, 29
See application file for complete search history.

(56) References Cited

U.S. PATENT DOCUMENTS

| | | | |
|---|---|---|---|
| 5,631,960 A * | 5/1997 | Likens et al. ................... 380/2 |
| 5,671,284 A * | 9/1997 | Buer ............................ 380/29 |
| 6,003,135 A * | 12/1999 | Bialick et al. .............. 713/201 |
| 6,028,939 A * | 2/2000 | Yin ............................ 713/189 |
| 6,078,663 A * | 6/2000 | Yamamoto ................... 380/260 |
| 6,366,117 B1 * | 4/2002 | Pang et al. .................... 326/38 |

OTHER PUBLICATIONS

National Institute of Standards, U.S. Department of Commerce, "Data Encryption Standard (DES)," Oct., 1999.
Schneier, Bruce, Applied Cryptography Second Edition: protocols, algorithms, and source code in C, Chapter 12 pp. 270-278, and 358-361, New York, NY: John Wiley & Sons, © 1996.
XILINX, "Virtex™ -E 1.8 V, Field Programmable Gate Arrays," DS022-2 (V2.6), p. 4, Nov. 19, 2002.
XILINX, "Virtex™ -II, Platform FPGAs: Detailed Description," DS031-2 (v2.1.2), p. 14, May 7, 2003.

* cited by examiner

*Primary Examiner*—Gregory Morse
*Assistant Examiner*—Matthew Heneghan
(74) *Attorney, Agent, or Firm*—Knobbe, Martens, Olson & Bear, LLP

(57) ABSTRACT

A data encryption/decryption circuit is presented that can be implemented in a field programmable gate array. First and second logic components are provided which are controlled by first and second control signal to direct data between memory and a data processing core (e.g., a DES or TDES processing core). In a ECB mode of operation, the logic components simply pass the data from the memory to the data processing core and from the data processing core to the memory. In CBC mode, the data from the memory is XORed with data from the appropriate data processing core in the first logic component during an encryption operation, and in the second logic component during a decryption operation.

17 Claims, 2 Drawing Sheets

CIPHER BLOCK CHAINING MODE IN ENCRYPTION/DECRYPTION PROCESSING

BACKGROUND OF THE INVENTION

The present invention pertains to the encryption/decryption of data. More particularly, the present invention pertains to cipher block chaining mode in the Data Encryption Standard (DES).

There are a variety of encryption schemes known in the art. DES (Data Encryption Standard), is the name of the Federal Information Processing Standard (FIPS) 46-3, which describes the data encryption algorithm (DEA). The DEA is also defined in the ANSI (American National Standards Institute) standard X9.32. DES uses a 56-bit key to encrypt and decrypt 64-bit blocks of data. As known in the art, the DES algorithm is implemented with software and/or hardware components. In particular, the data to be encrypted is exclusive ORed (XOR) with the encryption key and forwarded to a substitution box (SBOX). In the SBOX, six bits of input data are replaced with a four-bit value depending on preset tables. Each of these tables is made up of sixteen columns and four rows of four-bit values (i.e., from 0 to 15 in decimal). To select the appropriate four-bit value, four of the bits of the input data are used to select one column and two of the bits are used to select a row. The corresponding four-bit value in the table is then output.

The output value of the SBOX is supplied to a permutation box (PBOX) component, which performs a permutation operation on the concatenation of the output values from the SBOX component. In a DES system, these steps are repeated sixteen times. In a Triple DES system, these steps are repeated 48 times with up to three key values.

A common way of performing encryption using DES is referred to as Electronic CodeBook (ECB) mode. In ECB mode, each 64-bit block of "plaintext" is encrypted using the DES processing core. One problem with ECB mode is that it is relatively easy to break the encryption in that once a single 64-bit block has been inappropriately decrypted (e.g., by trying different "keys") the remaining blocks of the data can be easily decrypted using the same key.

A solution to these problems is cipher block chaining (CBC). In CBC, the first 64-bit block of plaintext is XORed with a random 64-bit block, and then transmitted to the DES processing core. The resultant 64-bit block is referred to as ciphertext and is then XORed with the next 64-bit block of plaintext. Again, the resultant 64-bit block is transmitted to the DES processing core. The process is repeated until all of the plaintext information is encrypted. CBC mode improves the encryption because in order to even try different keys, one must have the entire body of encrypted plaintext.

In implementing cipher block chaining with decryption and encryption provided by the processing core, one or more multiplexers are often used to ensure that the appropriate 64-bit block is transmitted to the processing core. A problem with multiplexers is that they take up valuable space of a processing chip such as a field programmable gate array. In view of the above, there is a need for an improved method and apparatus for implementing cipher block chaining.

DETAILED DESCRIPTION

Figure 1:
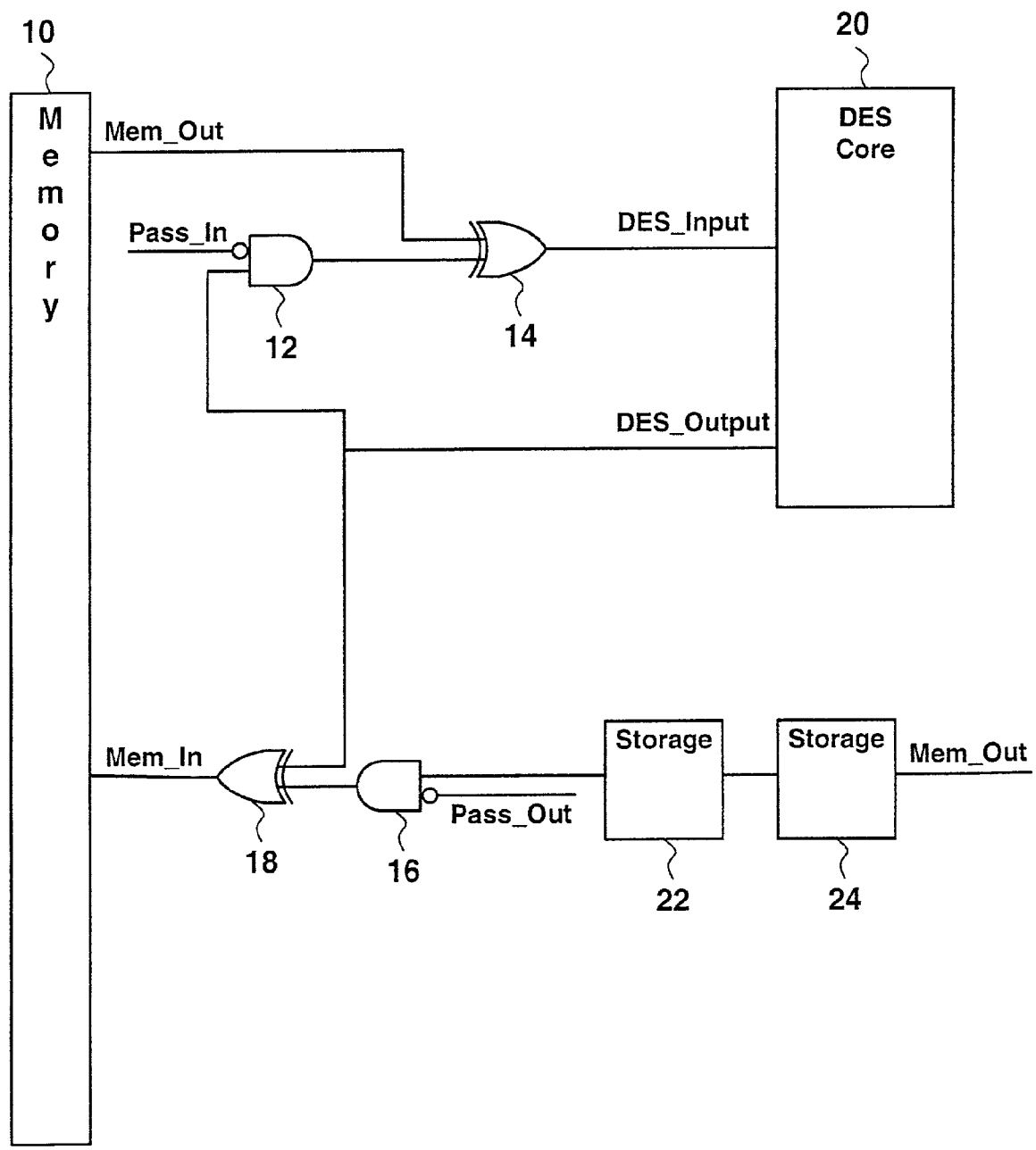
FIG. 1 is a block diagram of a circuit for implementation of cipher block chaining according to an embodiment of the present invention.

According to an embodiment of the present invention, a circuit is presented for the encryption and decryption of data that can be of a relatively small size and operate in a relatively fast manner. Referring to FIG. 1, a block diagram of a circuit is shown constructed according to an embodiment of the present invention.

The circuit of FIG. 1 can be used for the encryption and decryption of data, and can be used in the ECB and CBC modes of operation. Two control signals, Pass_In and Pass_Out are provided to control the flow of data in the circuit of FIG. 1.

For encryption of data, the data to be encrypted is stored in memory 10 and is supplied as Mem_Out to a first XOR gate 14. In ECB mode, the value of Pass_In is set to 1 and is supplied as a first input to first AND gate 12. Because the first input is negated, the 1 value for Pass_In causes the output of AND gate 12 to be 0 no matter the value at the second input to this component. At XOR gate 14, the second input will always be 0 as long as Pass_In has a 1 value. Thus, the output of XOR gate 14 in this situation will be the same as the values input as signal Mem_Out from memory 10. The data is provided as DES_Input to a data processing core (e.g., DES core 20) for encryption in a known manner. The resulting encrypted data is supplied as the signal DES_Output, which is supplied as the second input to AND gate 12 and a first input to a second XOR gate 18. In the circuit of FIG. 1, the second input of XOR gate 18 is supplied by a second AND gate 16. A first input of AND gate 16 receives the second control signal Pass_Out. For encryption in ECB mode, the value of Pass_Out is set to 1 and is negated as the first input to AND gate 16. Accordingly, the output of AND gate will always be 0 as long as Pass_Out is set to 1. The output of XOR gate 18 will be the DES_Output signal supplied by the DES core 20. So, for encryption in ECB mode, data to be encrypted is supplied from memory 10 to DES core 20 and the resulting encrypted data is supplied back to memory 10.

For encrypting data in CBC mode, the Pass_In signal is set to 0 and the Pass_Out signal is set to 1. Looking at FIG. 1, with the Pass_In signal set to 0, the output of AND gate 12 is the same as the DES_Output signal from DES core 20. Thus, XOR gate 14 XORs unencrypted data with the previously encrypted data from the DES_Output and the result is encrypted by the DES core 20 as required in the CBC mode. The DES_Output is supplied as the Mem_In signal to memory 1 as well because the Pass_Out signal is set to 1.

For decrypting data in the ECB mode, the Pass_In and Pass_Out signals are set to 1 (as with the encryption operation). Accordingly, encrypted data from memory 10 is supplied as DES_Input to DES core 20 and the resulting decrypted data is supplied as DES_Output to Mem_In at memory 10.

For decrypting data in CBC mode, a previous block of encrypted data is to XORed with a current block of decrypted data. Accordingly, data to be decrypted is stored temporarily in storage devices 22 and 24. The Pass_In signal is set to 1 and the Pass_Out signal is set to 0. Data to be decrypted is supplied to XOR gate 14 as well as to storage device 24 (e.g., a D-type flip-flop). With Pass_In set to 1, the encrypted data at Mem_Out is supplied as the DES_Input to DES core 20. The resulting decrypted data for this current block is supplied to XOR gate 18. The encrypted data for a previous block is supplied via storage devices 22 and 24 to AND gate 16. With Pass_Out set to 0, this data is supplied to the second input of XOR gate 18. Accordingly, the decrypted data for the current block is XORed with the encrypted data of the previous block as required by the CBC mode and is supplied as Mem_In to memory 10.

Figure 2:
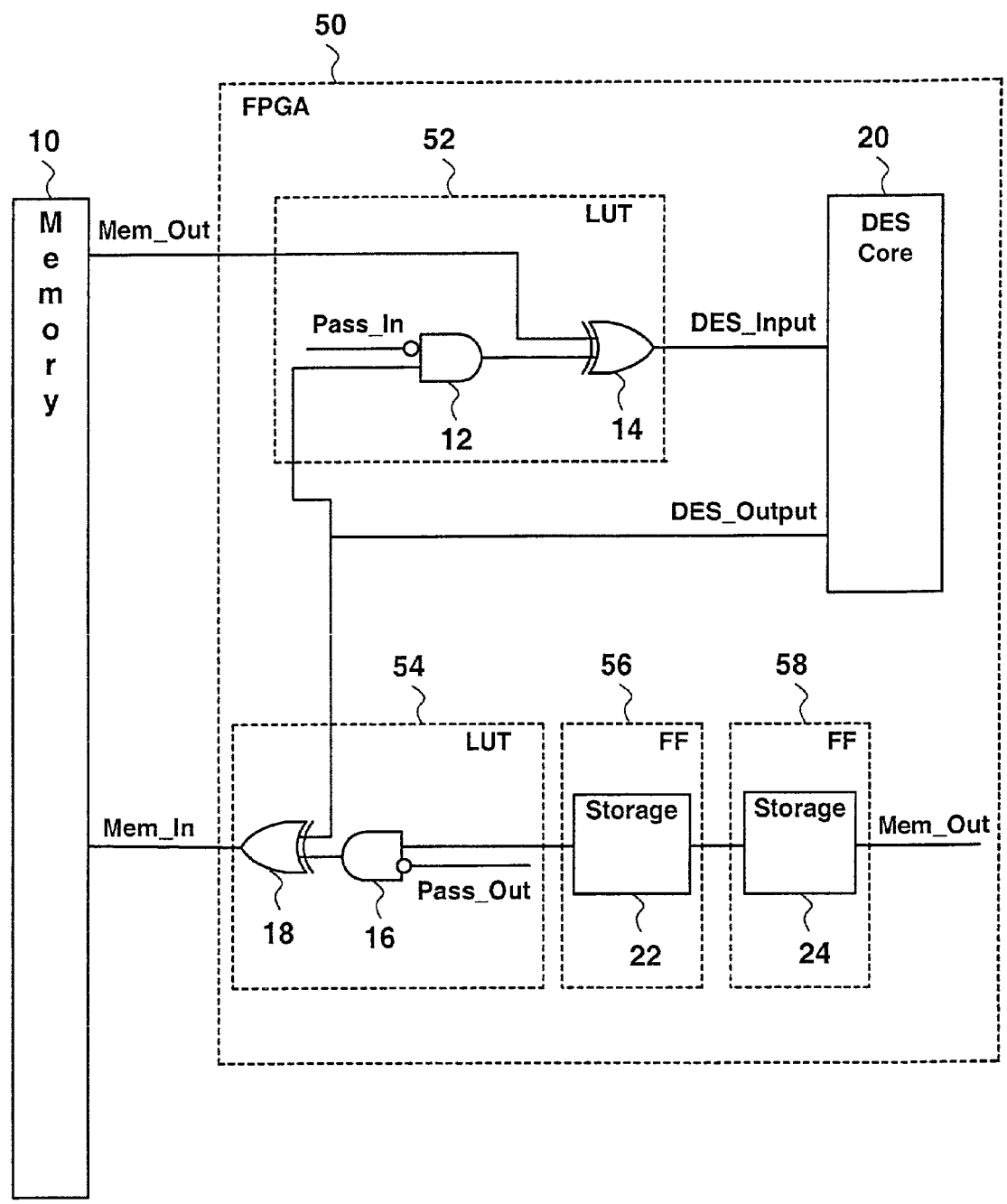
FIG. 2 is a block diagram showing how the individual components of FIG. 1 can be implemented into an FPGA design.

Referring to FIG. 2, a block diagram is presented showing how the individual components of FIG. 1 can be implemented into an FPGA design. In FIG. 2, the first AND gate 12 and first XOR gate 14 can be implemented in a first logic component (e.g., a single look-up table (LUT) 52) and the second AND gate 16 and XOR gate 18 can be implemented in a second logic component (e.g., a single LUT 54). As stated above, the storage devices 22 and 24 can be implemented as D-type flip-flops 56 and 58. Accordingly, the LUTs 52 and 54, the flip-flops 56 and 58, and the DES core can be implemented in an FPGA device.

In one embodiment, the present invention may be used in the Virtex® and Vitrex®-E FPGA devices sold by Xilinx, Inc. (San Jose, Calif.). In these FPGA devices, there are a plurality of Configurable Logic Blocks or CLBs. Each CLB element includes two slices, and each slice includes two four-input LUTs and two D-type flips flops. Accordingly, in this embodiment of the present invention, the two LUTs could be used to implement the two LUTS of FIG. 2 and the two flip-flops could be used to implement the storage devices of FIG. 2. The DES core would be implemented separately.

As stated above, multiplexers take up a lot of valuable space in an FPGA design. In the circuits of FIGS. 1 and 2, each AND and XOR gate serves as a multiplexer to select the appropriate data to pass to the DES core 20 and the memory 10. First, AND gate 12 and XOR gate 14, together, function as a multiplexer in that the Pass_In signal selects whether the Mem-Out signal or the XOR of the Mem_Out and DES_Output signals are output. Second, AND gate 16, and XOR gate 18, together function as a multiplexer in that the Pass_Out signal selects whether the DES_Output signal or XOR of the DES_Output and Mem_Out signals are output. Using the gates in this manner eliminates the need to include separate multiplexers to control the selection of data in the ECB and CBC modes.

In an alternative embodiment, the AND and XOR logic gates could be implemented in an application specific integrated circuit separate from the DES core. In such a case, the use of these logic gates will be simpler than standard multiplexer designs for ASIC circuits.

Although several embodiments are specifically illustrated and described herein, it will be appreciated that modifications and variations of the present invention are covered by the above teachings and within the purview of the appended claims without departing from the spirit and intended scope of the invention. For example, though the invention is described with respect to a DES encryption/decryption technology, the present invention can be extended to other encryption technologies such as TDES and AES (Advanced Encryption Standard; National Institute of Standards and Technology—Draft of February, 2001 available at http://www.nist.gov/aes).

What is claimed is:

1. A circuit to perform at least one of an encryption and a decryption operation on data, comprising:
   a logic component configured to receive data from a memory, data from a data processing core, and a control signal;
   wherein said logic component comprises an AND gate to receive said control signal and said data from the data processing core and an XOR gate to receive said data from the memory and an output of said AND gate; the logic gate being configured to output one of
      said data from the memory and
      an Exclusive OR combination of said data from the memory and said data from the data processing core based on said control signal.

2. The circuit of claim 1 wherein said logic component is a look-up table in a field programmable gate array.

3. The circuit of claim 2 wherein said data processing core is one of a Data Encryption Standard core and a Triple Data Encryption Standard core.

4. The circuit of claim 1 wherein said data processing core is one of a Data Encryption Standard core and a Triple Data Encryption Standard core.

5. A circuit to perform at least one of an encryption and a decryption operation on data, comprising:
   a storage device to receive data from a memory; and
   a logic component to receive said data from the storage device, data from a data processing core and a control signal, the logic component comprising an AND gate to receive said control signal and said data from the storage device and an XOR gate to receive said data from the data processing core and an output of said AND gate; wherein said logic component is to output one of said data from the data processing core and an Exclusive OR combination of said data from the data processing core and said data from the storage device.

6. The circuit of claim 5 wherein said logic component is a look-up table in a field programmable gate array.

7. The circuit of claim 6 wherein said data processing core is one of a Data Encryption Standard core and a Triple Data Encryption Standard core.

8. The circuit of claim 5 wherein said data processing core is one of a Data Encryption Standard core and a Triple Data Encryption Standard core.

9. A circuit to perform at least one of an encryption and a decryption operation on data comprising:
   a first logic component to receive data from a memory, data from a data processing core, and a first control signal; wherein said first logic component comprises a first AND gate to receive said first control signal and said data from the data processing core and a first XOR gate to receive said data from the memory and an output of said first AND gate, the first logic component being configured to output one of said data from the memory and an Exclusive OR combination of said data from the memory and said data from the data processing core based on said first control signal;
   a storage device to receive data from a memory; and
   a second logic component to receive said data from the storage device, data from a data processing core and a second control signal; wherein said second logic component comprises a second AND gate to receive said second control signal and said data from the storage device and a second XOR gate to receive said data from the data processing core and an output of said second AND gate, the second logic component being configured to output one of said data from the data processing core and an Exclusive OR combination of said data from the data processing core and said data from the storage device.

10. The circuit of claim 9 wherein said each of said first and second logic components is a look-up table in a field programmable gate array.

11. The circuit of claim 9 wherein said storage device is a flip-flop in a field programmable gate array.

12. The circuit of claim 11 wherein said data processing core is one of a Data Encryption Standard core and a Triple Data Encryption Standard core.

13. The circuit of claim 9 wherein said data processing core is one of a Data Encryption Standard core and a Triple Data Encryption Standard core.

14. A method of performing at least one of an encryption and a decryption operation on data, comprising:
  transmitting data from a memory to a first logic component;
  transmitting data from a data processing core to said first logic component, the first logic component comprising an AND gate to receive a control signal and said data from the memory and an XOR gate to receive said data from the data processing core and an output of said AND gate; and
  outputting one of said data from the memory and an Exclusive OR combination of said data from the memory and said data from the data processing core to said data processing core.

15. The method of claim 14 wherein said outputting operation to said data processing core is based on a first control signal.

16. The method of claim 15 further comprising: transmitting said data from the memory to a storage device; transmitting data from the storage device to a second logic component; transmitting said data from the data processing core to said second logic component; and outputting one of said data from the data processing core and an Exclusive OR combination of said data from the data processing core and said data from the storage device to said memory.

17. The method of claim 16 wherein said outputting operation to said memory is bases on a second control signal.

* * * * *